Patented Aug. 26, 1947

2,426,214

UNITED STATES PATENT OFFICE 2,426,214

INSECTICIDAL OIL SPRAY

Charles K. Hewes, Los Angeles, Calif., assignor to Richfield Oil Corporation, Los Angeles, Calif., a corporation of Delaware No Drawing. Application December 15, 1941, Serial No. 423,036

7 Claims. (Cl. 167—28)

This invention relates to an insecticidal or anti-parasitic spray for application to sensitive foliage.

For the control of insecticides, such for example as the red and black scale, infesting citrus fruit, there have been employed certain petroleum base spray oils. Such spray oils have been normally compounded from that fraction of petroleum having a viscosity of about 55 to 120 seconds Saybolt at 100° F. However, it has been found that the effectiveness of such spray oils has diminished in recent years, as apparently the parasites have become immune to an extent to the applications of such type of spray. Attempts have been made to employ lighter lower boiling fractions of petroleum in spray oils, such for example as the kerosene type of fractions.

It has also been found that fruit produced from trees sprayed with ordinary spray oil is inferior (with respect to sugar, acid, and solid content) to fruit from trees that have been fumigated or sprayed with kerosene oils. Furthermore, ordinary spray oils cause a high percentage of fruit to drop in cold, damp weather, while the kerosene sprays do not cause this action to any such extent.

Spray oils employing the lighter or kerosene fractions of petroleum as heretofore prepared have had the disadvantage that the oil penetrates into the foliage, bark, and fruit so rapidly that it has been necessary to apply excessive amounts in order to assure contact between the oil and the scale. The use of such excessive quantities of spray oil has proved in practice to be detrimental to the sensitive foliage of the plants, so that effective control of parasites by the use of kerosene sprays without injury to the foliage of the plant has not heretofore been attained. It is a self-evident fact that if the penetration of the kerosene into the foliage, twigs, and bark of the plant could be eliminated the injury could be prevented. In fact, others have previously claimed that they could retard the penetration, but such retardation has been negligible. We also know that the injury resulting from the use of kerosene has been lessened by utilizing a product having a high unsulfonated residue test, i. e., 92% or better.

It is the general object of the present invention to provide an insecticidal oil spray for such sensitive foliage, employing kerosene or similar fractions of petroleum as the base of the spray, which oil spray will not be destructive to the sensitive foliage of the plant to which it is applied.

I have discovered that the disadvantages inherent to the kerosene type of spray oils may be overcome by the addition to such spray oils of a material adapted to increase the viscosity of the oil content. By so increasing the viscosity of the oil content, the penetration of the foliage by the oil spray can be sufficiently reduced to substantially eliminate damage to the sensitive foliage. By reducing the penetration, it enables one to employ a kerosene of lower unsulfonated residue test and consequent greater insecticidal potency. Furthermore, this reduction in the penetration of the spray into the sensitive foliage is accomplished without substantial alteration of the efficiency of the kerosene type spray in controlling parasites. Accordingly, by the use of the spray of the present invention, considerably heavier application of the spray material may be employed in practice without detrimental effects.

For example, where it was previously found necessary to limit the application of spray oil containing kerosene, so that only about 86 cc. of kerosene was applied to 1,000,000 square centimeters of surface to be treated, I have found it possible with the spray oil of the present invention to increase the application of oil to 320 cc. of oil per million square feet of surface to be treated.

For increasing the viscosity of the kerosene content of such spray oil, I have employed compounded aluminum salts, such as the stearates, palmitate, and oleate. I have used aluminum monostearate, aluminum distearate, and aluminum tristearate. All are satisfactory when properly compounded, and I find that the approximate relative amounts of these three stearates that give comparable results are:

| | Pound |
|---|---|
| Aluminum monostearate | 0.75 |
| Aluminum distearate | 1.00 |
| Aluminum tristearate | 1.25 |

I do not limit myself to the use of the stearates for I have also obtained excellent results with aluminum palmitate, and I further find that I may also employ aluminum oleate. Various ingredients, such for example as those described in the Knight Patents Nos. 1,949,799 and 2,124,782, have been admixed with the kerosene fraction of a spray oil, but these materials have not had any significant effect on the viscosity of the kerosene, nor do they retard to any practical extent the penetration into the foliage. In order to properly modify the viscosity of the kerosene of the spray oil, I have found it necessary to employ a compounded aluminum salt of the higher fatty acids. By a compounded salt of the higher fatty acids, I mean such a salt containing admixed therewith any one of the following chemicals, or a combination of them:

(*a*) The lower boiling alcohols, such as methanol, ethanol, propanol, and isopropanol.

(*b*) The glycols and their substituted derivatives, such as diethylene glycol monoethyl ether.

(*c*) Glycerine.

(*d*) Cresols and phenol.

(*e*) Acetic acid.

In the case of certain compounds which are soluble in kerosene to only a limited extent, I have found that I can increase their solubility and thereby enhance their value for my purpose by employing mutually soluble coupling agents, such as sperm oil and castor oil.

As one example of a suitable compounded aluminum salt, I may use aluminum distearate containing admixed therewith ethylene glycol monoethyl ether in the proportion of 90% and 10%, respectively. The employment of aluminum distearate alone, or other similar agents, is not effective for suitably modifying the viscosity of the kerosene. If sufficient of the aluminum distearate is added, the kerosene oil will be caused to set to a solid. When it is modified by the addition thereto of one or more of the compounding agents I have listed above, I have found that its addition to kerosene desirably alters the viscosity of the kerosene without settling the kerosene to a solid.

In forming the insecticidal spray of the present invention, I employ a kerosene fraction of petroleum. Such a kerosene fraction of petroleum normally has a viscosity of from 31 to 35 seconds Saybolt at 100° F. and a boiling point range within approximately the limits of 350 to 575° F.

The kerosene employed may be a partially refined product having an unsulfonated residue test of 80% or more. To such a kerosene oil, I add sufficient of the compounded aluminum stearate to materially increase the viscosity of the oil. For example, the addition of ½% to ¾% of the compounded aluminum stearate is satisfactory for increasing the viscosity of the oil from its original value of from 31 to 35 sectonds Saybolt at 100° F. to a value of 45 to 60 seconds Saybolt at 100° F. The quantity of the compounded aluminum stearate to be added generally should be between about ¼% and 1% by weight.

For emulsifying the oil and compounded aluminum stearate with water, I employ any usual or preferred emulsifier, such as casein or blood albumin, blood albumin being preferred as it is unaffected by the hardness of the water. A suitable spray for the control of red and black scale on citrus trees consists of about 7 parts by weight of kerosene oil containing the compounded aluminum stearate to 93 parts by weight of water and a small amount of casein or blood albumin necessary to effect the desired emulsification. My improved spray oil may also be readily used in the type of application wherein the spray oil without water or emulsifier is atomized, thereby covering the surface of the tree.

If desired, of course, there may be added to the spray oil of the present invention any preferred or desired toxic material for the purpose of effecting a better kill of the red or black scale, and in such case any usual or well-known toxic substance may be employed. The use of cresols as the compounding agent increases the toxicity of the spray.

The present invention is of the scope set forth in the appended claims.

I claim:

1. An insecticidal composition, including an insecticidal kerosene fraction of mineral oil and an aluminum salt of the group consisting of aluminum stearates, aluminum palmitate, and aluminum oleate, the aluminum salt being mixed with a member of the group consisting of lower boiling alcohols, glycol, and glycerine.

2. An insecticidal composition, including an insecticidal kerosene fraction of mineral oil and an aluminum salt of a higher fatty acid compounded from the group consisting of lower boiling alcohols, glycols and glycerine.

3. An insecticidal spray oil, containing and insecticidal mineral oil of the kerosene type in combination with a compounded aluminum salt of a higher fatty acid, the aluminum salt being mixed with a member of the group consisting of lower boiling alcohols, glycol, and glycerine, the amount of the compounded aluminum salt being between ¼% and 1% of the mineral oil.

4. An insecticidal composition, containing an insecticidal mineral oil of the kerosene type with sufficient compounded aluminum salt of a higher fatty acid to increase the viscosity of the kerosene to about 40 to 60 seconds Saybolt at 100° F., the aluminum salt being mixed with a member of the group consisting of lower boiling alcohols, glycol, and glycerine.

5. An insecticidal composition, including mineral oil of the kerosene type adapted to yield 80% or more unsulfonated residue, a compounded aluminum salt of a higher fatty acid for increasing the viscosity of said oil, the aluminum salt being mixed with a member of the group consisting of lower boiling alcohols, glycol, and glycerine and an emulsifying agent.

6. An insecticidal composition, including a refined mineral oil of the kerosene type capable of yielding at least 80% unsulfonated residue, sufficient aluminum salt of a higher fatty acid to increase the viscosity of the kerosene to about 40 to 60 seconds Saybolt at 100° F., the aluminum salt being mixed with a member of the group consisting of lower boiling alcohols, glycol, and glycerine, and an emulsifying agent.

7. An insecticidal composition, including a refined mineral oil of the kerosene type capable of yielding at least 80% unsulfonated residue and sufficient compounded aluminum salt of the group consisting of aluminum stearates, palmitate, and oleate to increase the viscosity of the kerosene to about 40 to 60 seconds Saybolt at 100° F., the aluminum salt being mixed with a member of the group consisting of lower boiling alcohols, glycol, and glycerine, and an emulsifying agent.

CHARLES K. HEWES.

REFERENCES CITED

The following references are of record in the file of this patent:

UNITED STATES PATENTS

| Number | Name | Date |
|---|---|---|
| 2,247,577 | Flaxman | July 1, 1941 |
| 2,101,373 | Lindstaedt | Dec. 7, 1937 |
| 2,155,630 | Anderson | Apr. 25, 1939 |
| 2,240,806 | Sharp | May 6, 1941 |
| 2,163,560 | Parker | June 20, 1939 |